(12) United States Patent
Chen et al.

(10) Patent No.: US 8,712,976 B1
(45) Date of Patent: Apr. 29, 2014

(54) MANAGING DEDUPLICATION DENSITY

(75) Inventors: Xiangping Chen, Shrewsbury, MA (US); Richard P. Ruef, Santa Cruz, CA (US); Philippe Armangau, Acton, MA (US); Karl M. Owen, Chapel Hill, NC (US); Mark K. Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 78 days.

(21) Appl. No.: 13/432,312

(22) Filed: Mar. 28, 2012

(51) Int. Cl.
*G06F 17/30* (2006.01)

(52) U.S. Cl.
USPC .......................................................... 707/692

(58) Field of Classification Search
CPC ............................................... G06F 17/30156
USPC .......................................................... 707/692
See application file for complete search history.

(56) References Cited

U.S. PATENT DOCUMENTS

| 2009/0234795 A1* | 9/2009 | Haas et al. | 707/1 |
| 2011/0022825 A1* | 1/2011 | Spackman | 712/240 |
| 2013/0054906 A1* | 2/2013 | Anglin et al. | 711/159 |

* cited by examiner

*Primary Examiner* — Jean M Corrielus
*Assistant Examiner* — Evan Aspinwall
(74) *Attorney, Agent, or Firm* — Krishnendu Gupta; Deepika Bhayana

(57) ABSTRACT

A method is used in managing deduplication density. A deduplication density of a data object is determined. The deduplication density is indicated by a number of deduplicated data objects represented by the data object. Based on the deduplication density of the data object, the data object is skipped for applying a deduplicating technique to the data object. An association is created between the data object and another data object. The other data object is used for applying the deduplicating technique where contents of the other data object are identical to contents of the data object.

18 Claims, 9 Drawing Sheets

MANAGING DEDUPLICATION DENSITY

CROSS REFERENCE TO RELATED APPLICATIONS

This application is related to co-pending U.S. patent application Ser. No. 13/432,276 entitled MANAGING DEDUPLICATION DENSITY filed on Mar. 28, 2012, which is hereby incorporated herein by reference.

BACKGROUND

1. Technical Field

This application relates to managing deduplication density.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Deduplication is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges, especially when recovering data. It may be difficult or impossible to recover a deduplicated data block that may represent a large number of data blocks containing identical contents when the deduplicated data block becomes inaccessible.

SUMMARY OF THE INVENTION

A method is used in managing deduplication density. A deduplication density of a data object is determined. The deduplication density is indicated by a number of deduplicated data objects represented by the data object. Based on the deduplication density of the data object, the data object is skipped for applying a deduplicating technique to the data object. An association is created between the data object and another data object. The other data object is used for applying the deduplicating technique where contents of the other data object are identical to contents of the data object.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
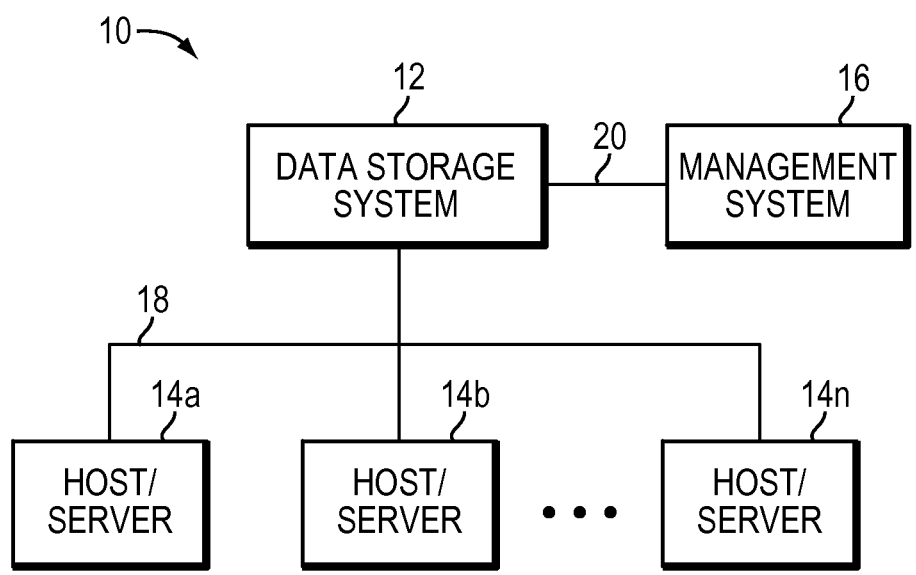
FIGS. 1 and 2A-2B are examples of an embodiment of a computer system that may utilize the techniques described herein.

Described below is a technique for use in managing deduplication density, which technique may be used to provide, among other things, determining a deduplication density of a data object, where the deduplication density is indicated by a number of deduplicated data objects represented by the data object, and based on the deduplication density of the data object, skipping the data object for applying a deduplicating technique to the data object, and creating an association between the data object and another data object, where the other data object is used for applying the deduplicating technique, where contents of the other data object are identical to contents of the data object.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the data blocks that contain identical information, and mapping the identical data blocks to a single copy of the data. Thus, in a deduplicated system, a single data block may represent a large number such as hundreds of deduplicated data blocks such that each deduplicated data block refers to the single data block stored on a storage device (e.g. a disk). As a result, conventionally, in such a deduplicated system, if a data block representing a large number of deduplicated data blocks becomes inaccessible, it is difficult or impossible for the deduplicated data blocks referring to the data block to access data thereby increasing the amount of time it takes to recover access to data. Thus, in such a conventional system, a large number of deduplicated data blocks cannot access data until a data block representing the deduplicated data blocks is recovered. Thus, in such a conventional system, although data deduplication saves storage space by eliminating redundant (duplicate) data (such as, files) on a data storage system, a large number of deduplicated data blocks referring to a single data block are unable to access data when the single data block becomes inaccessible due to a failure such as corruption of a data block.

By contrast, in at least some implementations in accordance with the technique as described herein, the use of the managing deduplication density technique can provide one or more of the following advantages: reducing or eliminating data loss by defining a maximum number of references permitted for a deduplicated data block, reducing the amount of time required for recovering a deduplicated data block by associating two or more deduplicated blocks containing identical data with one another, and improving storage reliability by managing the number of deduplicated data blocks represented by a single data block.

In at least one storage system implementation in accordance with the current technique as described herein, managing deduplication density includes skipping data blocks for data deduplication processing based on deduplication density of data blocks, such that a data block that represents a large number of deduplicated data blocks containing identical contents is not selected for deduplicating additional identical data blocks.

In at least one embodiment of the current technique, a data deduplication process evaluates deduplication density of a data block before deduplicating another data block containing contents identical to the data block. The deduplication density of a data block indicates the number of deduplicated data blocks represented by the data block such that each deduplicated data block refers to the data block. Further, a threshold value may be defined indicating the maximum number of deduplicated data blocks that may be represented by a single data block. Thus, when the deduplication density of a data block reaches the threshold value, the data block is not used for deduplicating additional data blocks. In such a case, another data block that contains data identical to the data block is used for deduplicating additional data blocks. Further, in at least one embodiment of the current technique, if the deduplication density of a data block reaches the threshold value indicating the maximum number of deduplicating data blocks that may be represented by the data block, a second data block that is used for deduplicating additional data blocks is associated with the data block such that the data block and the second data block serve as a backup copy for one another. Thus, in such a case, if the data block becomes inaccessible, data may be recovered efficiently by using the second data block. Similarly, in such a case, if the second data block becomes inaccessible, data may be recovered efficiently by using the data block. Thus, in at least one embodiment of the current technique, a data storage system maintains association between identical copies of data bocks that have not been deduplicated to each other based on deduplication density of the identical data blocks such that if any one of the identical data blocks is lost or becomes inaccessible, data of the lost or inaccessible data block may simply be recovered from any one of the remaining identical data blocks that are associated with the lost or inaccessible data blocks.

In at least one embodiment of the current technique, the deduplication density manages the degree of deduplication in a data storage system. Further, in at least one embodiment of the current technique, the threshold for the deduplication density of a data block may be configured using a default value that may be specified by a user of a data storage system. Further, the default value may be determined using statistical information managed by a data storage system. Further, the threshold value for deduplication density may also be updated dynamically such that the deduplication density changes to a different value. Thus, in at least one embodiment of the current technique, a user may dynamically change the threshold value in order to efficiently balance deduplication efficiency and data reliability. Thus, by managing the deduplication density of a data block, the number of deduplicated data blocks that may be impacted if the data block becomes inaccessible may be managed efficiently such that the amount of time it may take to recover the data block is reduced.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2A:
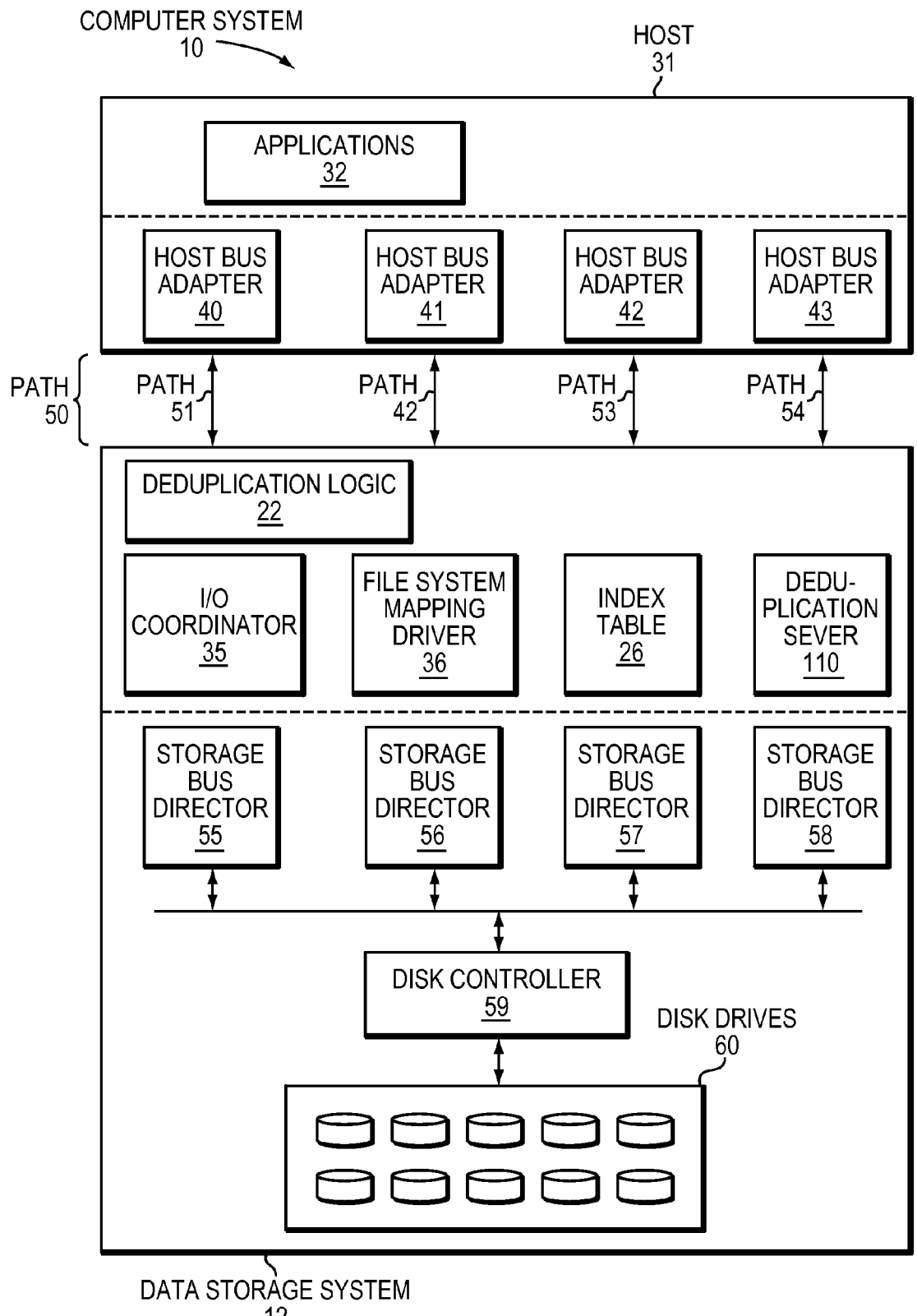
Figure 2B:
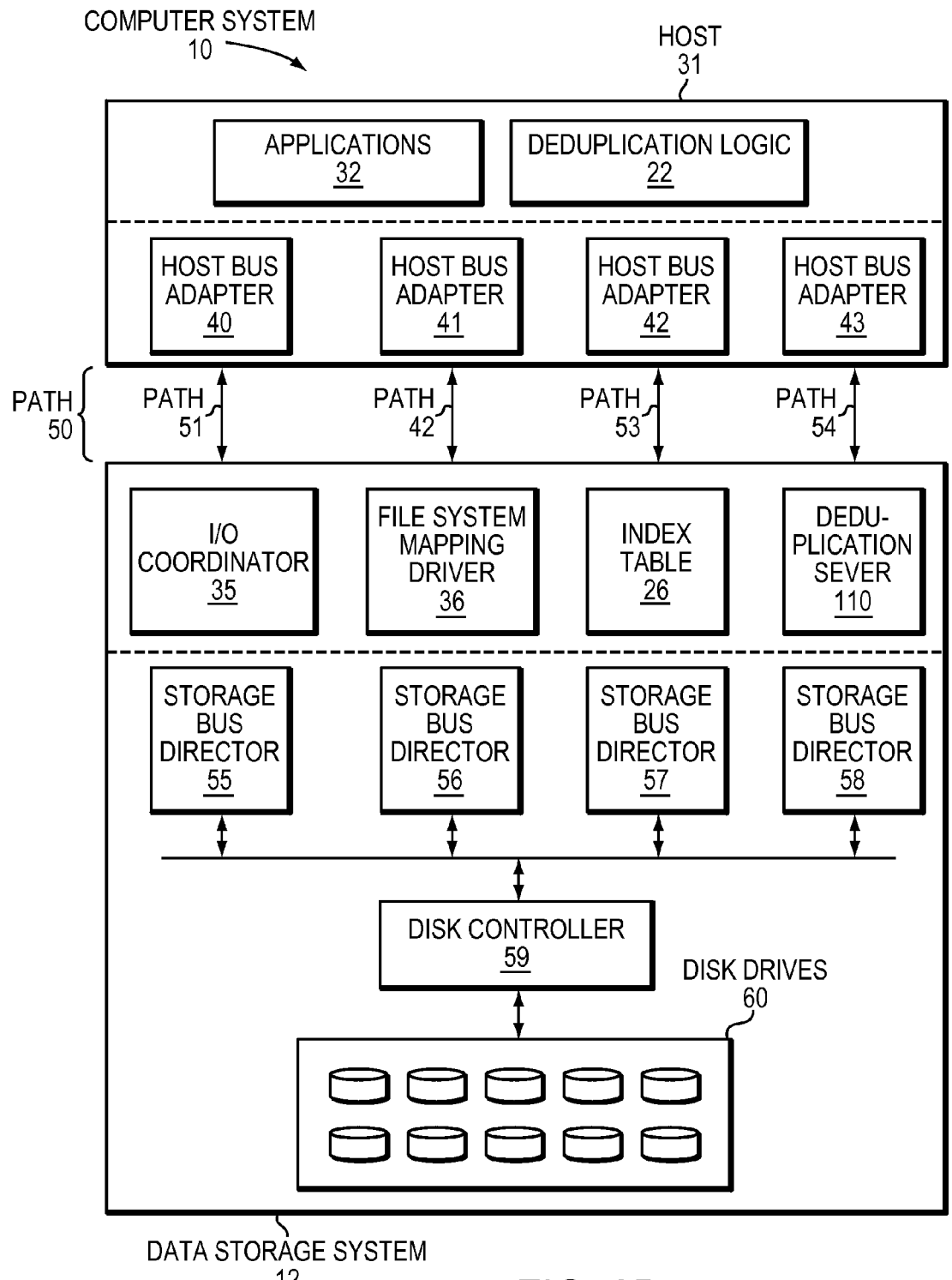

Referring to FIGS. 2A and 2B, shown is a more detailed example of an embodiment of a computer system that may be used in connection with performing the techniques described herein. A computer system 10 may include multiple hosts and multiple data storage systems in such a way that each host may access data on each of data storage systems. For simplicity, however, FIG. 2A and FIG. 2B illustrate a computer system 10 that includes a single host 31 and a single data storage system 12. Applications 32 running on an operating system of host 31 may access data in data storage system 12 via I/O driver and host bus adapters 40, 41, 42, and 43. Host 31 can be, for example, a server, a personal computer, or any other devices capable of initiating read and write requests to data storage system 12. Host 31 has multiple paths 50 for sending I/O requests to data storage system 12. Typically, there are at least two paths from a host to a data storage system. FIGS. 2A and 2B show four paths from host 31 to data storage system 12: path 51, path 52, path 53, and path 54. Each of the paths 50 can be any of a number of different types of communication links that allow data to be passed between data storage system 12 and host 31. Each of the host bus adapters 40, 41, 42, and 43 would be adapted to communicate using an appropriate protocol via the paths 50 with the storage bus directors 55, 56, 57 and 58. For example, path 50 can be implemented as a SCSI bus with host bus adapters 40 and storage bus director 55 each being a SCSI driver. Alternatively, path 50 between the host 31 and the data storage subsystem 12 may be a Fibre Channel fabric. Moreover, a path 50 may include multiple communication path types and may be part of a communication network. Storage bus directors 55, 56, 57 and 58 further communicates with the disk controller 59 to access data stored on the disk drives 60. The disk controller 59 may be configured to perform data storage operations on behalf of the host 31.

In at least one embodiment of the current technique, deduplication logic 22 can be provided on data storage system 12 as shown in FIG. 2A. In an alternative embodiment, deduplication logic 22 may be provided also or instead on a host system, such as host system 31 as shown in FIG. 2B. As described elsewhere herein, deduplication logic 22 may be performed in a manner that is transparent to an application running on a host system. In at least one embodiment of the current technique, deduplication server 38 provides deduplication services in data storage system 12 by working in conjunction with I/O Coordinator 35 and File system mapping driver 36. I/O Coordinator 35 manages I/O operations in conjunction with the file system mapping driver 36. I/O Coordinator 35 provides framework for implementing digest and other I/O requests issued by the deduplication server 38. File system mapping driver 36 is a light-weight file system library that provides file system functionality and allows data storage system 12 to create files within a file system. File system mapping driver 36 processes I/Os directed to metadata of a file system and provides information regarding metadata (e.g., deduplication key, deduplication density) of a data block that is potentially a candidate for deduplication.

Figure 3:
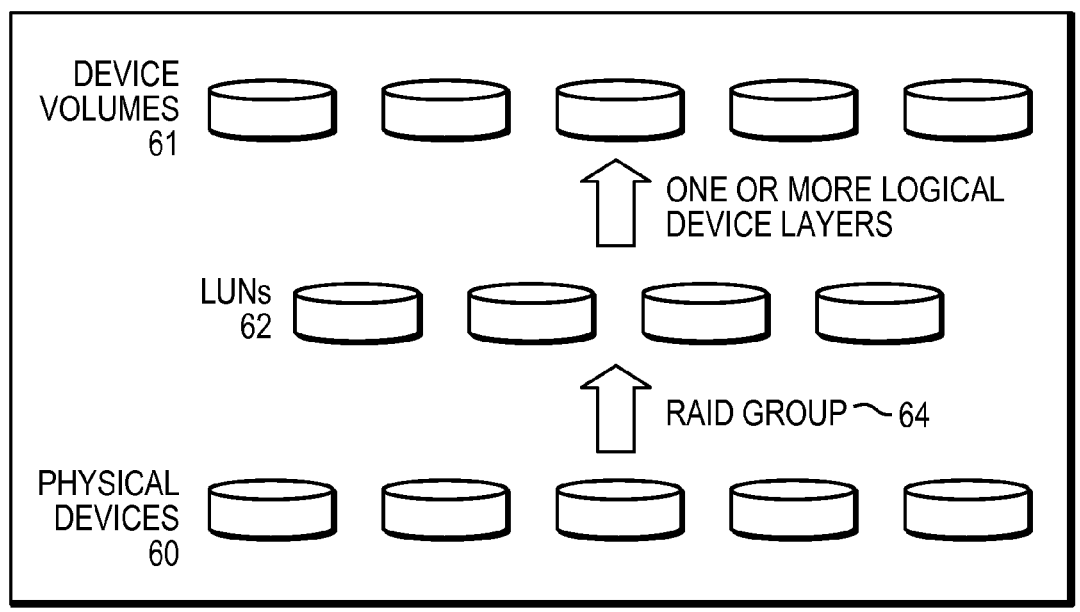
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

Generally, data deduplication for feature software requires that data blocks in a storage extent be identified for deduplication. A set of storage extents that are deduplicated together form a deduplication domain. Thus, data blocks of a storage extent in the deduplication domain are identified for deduplication processing. Data blocks may be identified for deduplication processing using any one of the known techniques such as iterating the data blocks according to a specific iteration scheme. During the deduplication processing, an index table of unique digests is created from the data blocks that are identified as candidates for deduplication. In such systems, an index table of unique digests is created to find commonality among the data set.

Figure 4:
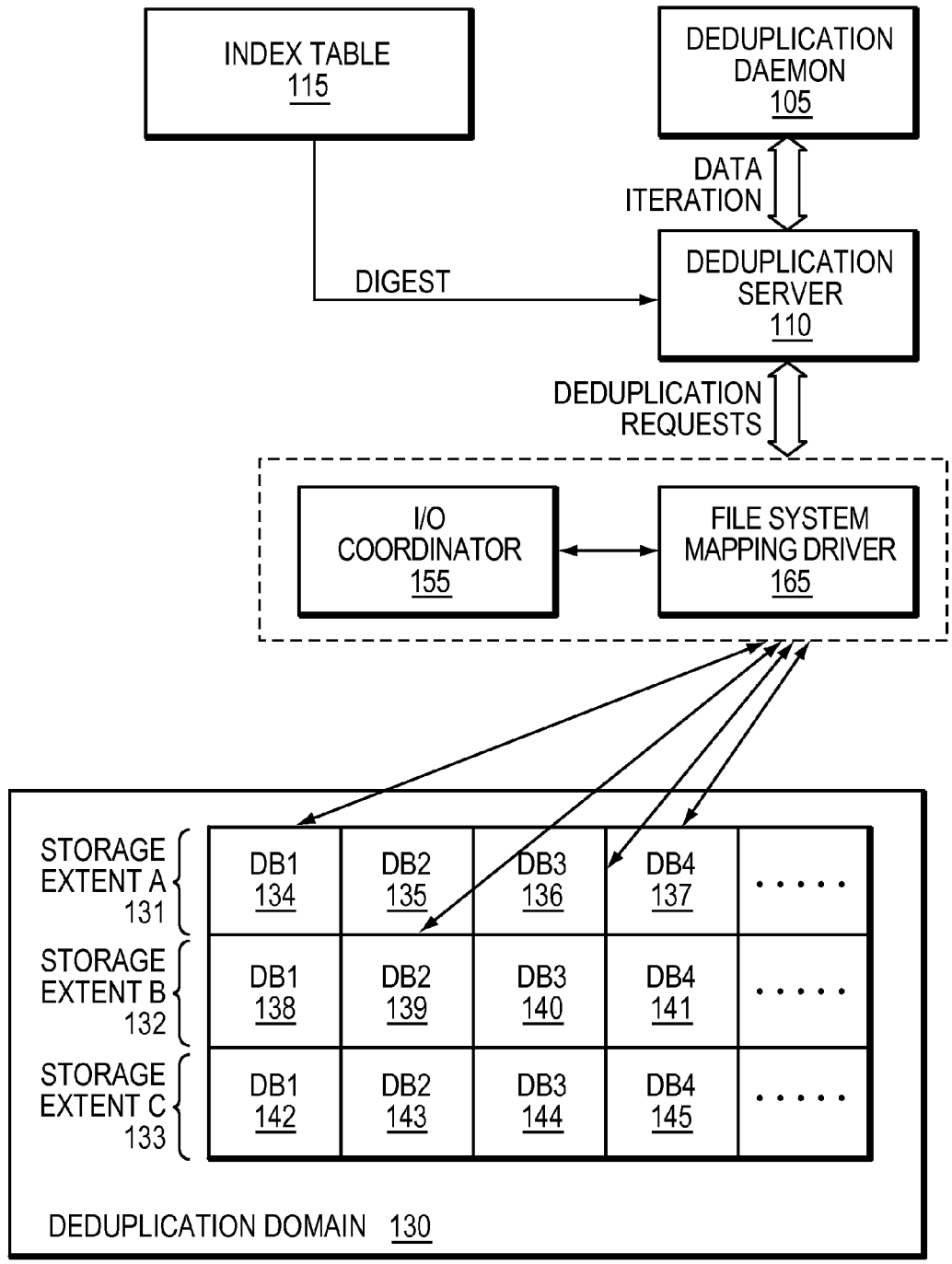
FIG. 4 is diagram illustrating in more detail components that may be used in connection with techniques herein.

Referring to FIG. 4, shown is a more detailed representation of components that may be included in an embodiment using the techniques herein. In a deduplication domain, each storage extent contains a range of data blocks. For example, in FIG. 4, storage extent A 131, storage extent B 132 and storage extent C 133 are part of the deduplication domain 130. Within a data storage system 70, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 4, storage extent A 131 includes data blocks 134-137, storage extent B 132 includes data blocks 138-141 and storage extent C 131 includes data blocks 142-145 and other data blocks (not shown).

In at least one embodiment of the current technique, deduplication server 110 is a component that provides services to deduplication daemon 105 to iterate over sets of data in a deduplication domain 130. Deduplication server 110 also computes digests and remaps blocks after the deduplication technique is applied to remove duplicate blocks of data. Deduplication daemon 105 maintains a deduplication database (e.g. an index table) for a deduplication domain 130. Deduplication daemon 105 communicates with the deduplication server 110 to iterate through deduplication domain 130 and computes digests for the data blocks that are iterated through. A digest is created for each chunk of data that is identified as a candidate for deduplication. Deduplication daemon 105 detects potential duplicate copies of data and issues a request to the deduplication server 110 to deduplicate the data. The deduplication database is stored on one of the storage extents that include one or more LUNs. Deduplication daemon 105 also maintains an index table 115 on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during deduplication processing. To accommodate more entries, the index table requires more memory and storage resources. Additionally, if the amount of storage used by the user is in terabytes, it can take days to identify chunks of data for such a large address space of the storage. Thus, the index table typically contains an incomplete set of entries and does not include digests for all of the data inside all of the storage in the deduplication domain.

In at least one embodiment, use of the current technique enables skipping data blocks for deduplication processing based on deduplication density of the data blocks. Deduplication server 110 interacts with I/O coordinator 155 and file system mapping driver 165 to skip a data block for deduplication processing during an iteration based on the deduplication density of the data block. In at least one embodiment of the current technique, the deduplication density of a data block may be determined from metadata of the data block. Thus, metadata of a data block may include information indicating the number of deduplicated data blocks represented by the data block. Further, in at least one embodiment of the current technique, index table 115 may include information indicating the deduplication density of a data block.

During deduplication processing as described herein, deduplication server 110 provides services to deduplication daemon 105 by interacting with I/O coordinator 155 and file system mapping driver 165. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of filesystem mapping driver 165. A filesystem allows dynamic manipulation of the address maps that connects LUN's logical address space to its physical address space. The file system also allows mapping a single block of storage at multiple locations within the filesystem, and allows handling of writes to shared blocks by allocating new storage and updating the shared address mappings. Thus, file system mapping driver 165 maintains metadata of data blocks that is evaluated to determine deduplication density of data blocks. I/O coordinator 155 manages I/O operations in conjunction with the file system mapping driver 165. I/O coordinator 155 provides framework for implementing digest and other I/O requests issued by the deduplication server 110.

Thus, deduplication daemon 105 and deduplication server 110 working in conjunction with one another identify data blocks for deduplication, compare data digest information of the data blocks, identify candidate data blocks for deduplication, issue deduplication requests, and maintain index table 115. Further, I/O coordinator 155 and file system mapping driver 165 working in conjunction with one another process deduplication requests received from deduplication server 110. File system mapping driver 165 performs a deduplication operation by creating a reference between duplicate data blocks and free up redundant instances of a deduplicated data block.

In at least one embodiment of the current technique, the file system mapping driver 165 may reject a deduplication request that attempts to deduplicate a data block with a candidate data block if the deduplication density of the data block reaches a threshold value indicating the maximum deduplication density for the data block. Further, in such a case, file system mapping driver 165 creates a link between the data block and the candidate data block in order to efficiently recover contents of deduplicated data blocks represented by the data block and the candidate data block. Further, file system mapping driver 165 rejects a deduplication request by evaluating deduplication density information stored in metadata of a data block. The deduplication density information for a data block indicates the number of deduplication operations performed on the data block. Thus, the deduplication density is used to manage deduplication operations performed on a data block such that an excessive number of deduplication requests directed to a data block are rejected. Further, the deduplication density of a data block may also be used for determining the amount of time it may take to recover the data blocks and deduplicated data blocks represented by the data block. Further, file system mapping driver 165 may also create and manage links between two or more identical data blocks in order to efficiently recover deduplicated data blocks if any one of the identical data blocks becomes inaccessible.

Further, in at least another embodiment of the current technique, index table 115 may include the deduplication density of a data block and skip deduplicating the data block based on the deduplication density. Further, index table 115 may also include information indicating association between two or more identical data blocks in order to efficiently recover deduplicated data blocks if any one of the identical data blocks becomes inaccessible.

Figure 5:
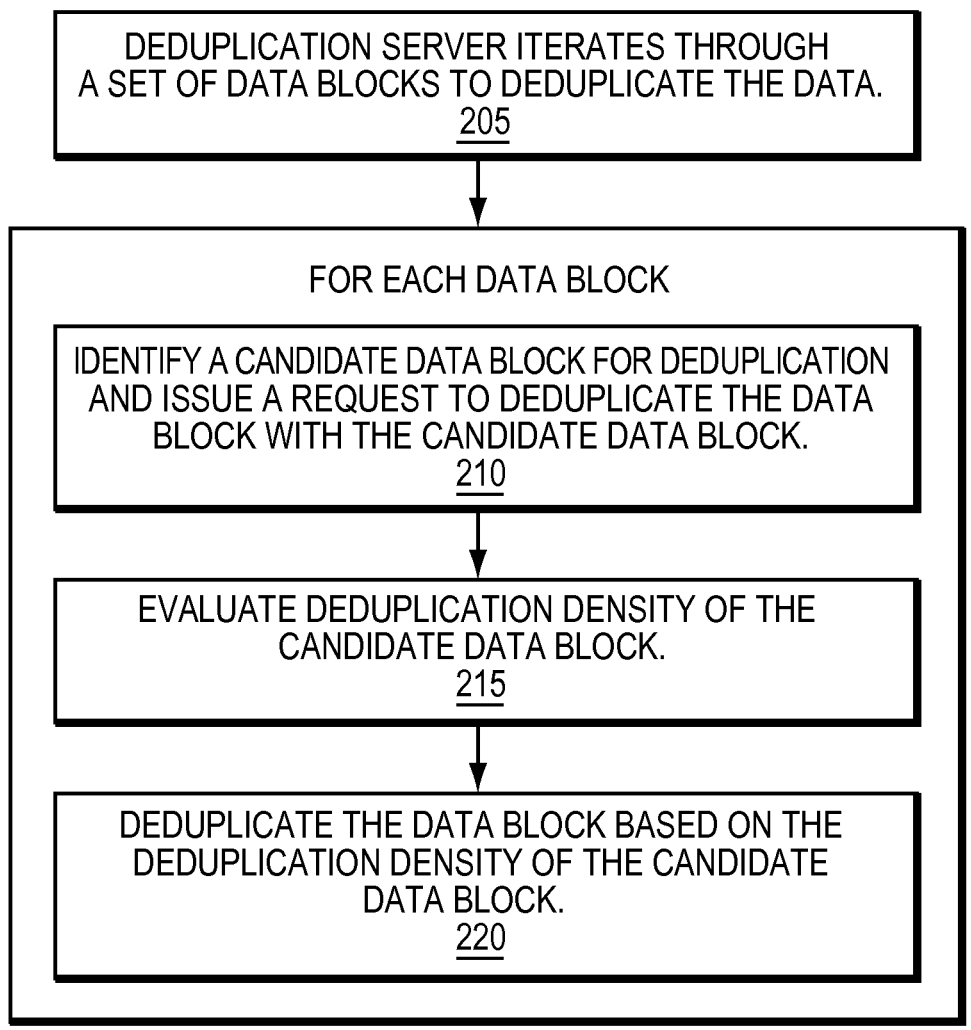
FIGS. 5-8 are flow diagrams illustrating processes that may be used in connection with techniques herein.

Referring to FIG. 5, shown is a flow diagram illustrating a flow of data in the data storage system. With reference also to FIG. 4, deduplication server 110 iterates through a set of data blocks in a deduplication domain based on an iteration scheme in order to deduplicate the set of data blocks (step 205). For each data block that is part of the iteration scheme, deduplication server 110 identifies a candidate data block and issues a request to deduplicate the data block with the candidate data block (step 210). The deduplication density of the data block is evaluated (step 215). The data block is skipped for deduplication processing based on the deduplication density of the data block. Deduplication server 110 deduplicates the data block based on the deduplication density of the data block (step 220).

Figure 6:
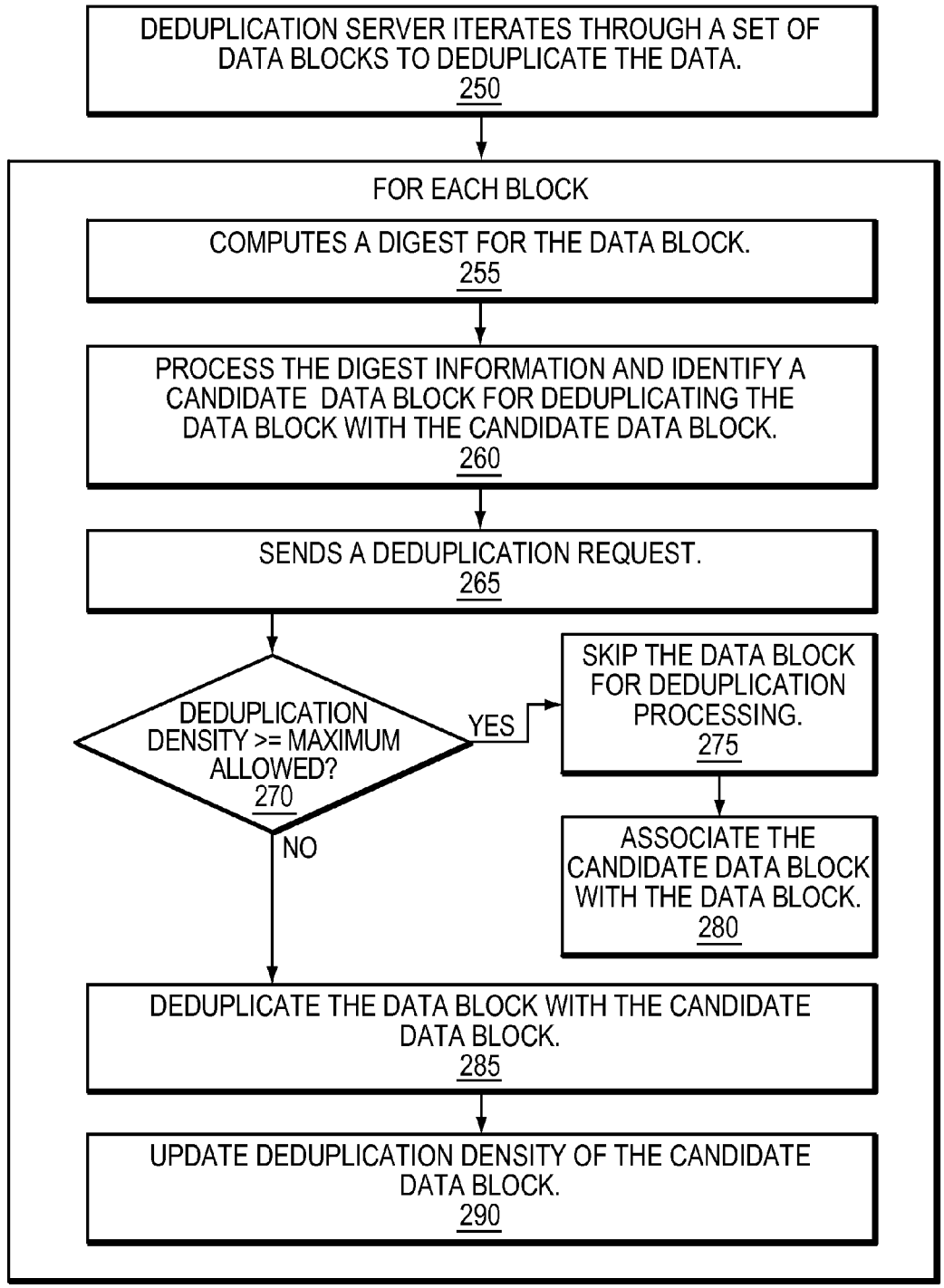

Referring to FIG. 6, shown is a more detailed flow diagram illustrating a flow of data in the data storage system. With reference also to FIG. 4, deduplication server 110 iterates through a set of data blocks in a deduplication domain in order to deduplicate the set of data blocks (step 250). For each data block of the set of data blocks, deduplication server 110 computes a digest for the data block in order to deduplicate the data block (step 255). The digest is processed and a candidate data block to which the data block may be deduplicated is identified (step 260). Deduplication server 110 sends a request to I/O coordinator 155 to deduplicate the data block with the candidate data block (step 265). I/O coordinator 155 sends the request to file mapping driver 165. The deduplication density of the candidate data block is evaluated to determine whether to skip the data block for deduplication processing (step 270). If the deduplication density of the candidate data block is greater than or equal to the maximum deduplication density indicated by a threshold value, the data block is skipped for deduplication processing and the iteration scheme then proceeds to process next data block (step 275). Further, the data block is associated with the candidate data block such that if either the data block or the candidate data block becomes corrupted, contents of the corrupted data block may be restored (step 280). However, if the deduplication density of the candidate data block is less than the maximum deduplication density, the data block is deduplicated to the candidate data block (step 285). Further, the deduplication density of the candidate data block is updated to indicate that the data block is now represented by the candidate data block (step 290).

Figure 7:
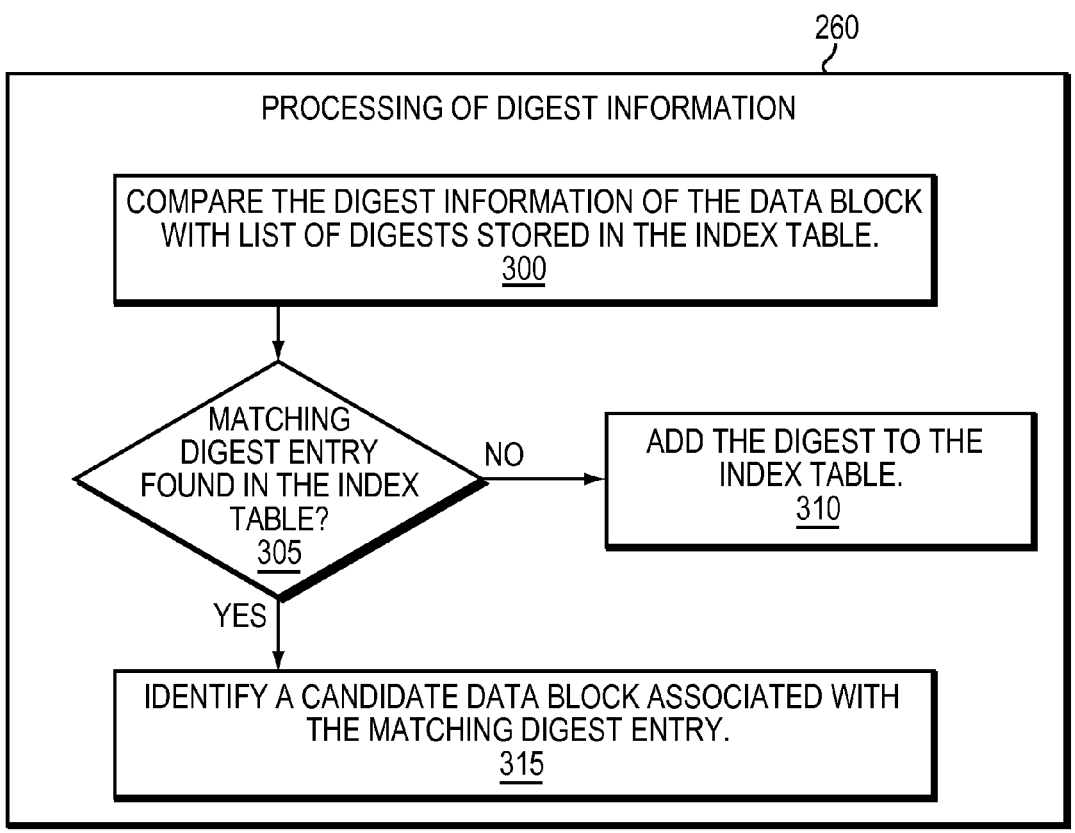

Referring now to FIG. 7 that illustrates a process of processing digest information for identifying a candidate data block. With reference also to FIG. 4, deduplication server 110 sends the digest for the data block computed in step 255 illustrated in FIG. 6 to deduplication daemon 105. Deduplication daemon 105 then compares the digest for the data block with list of digests stored in the index table 115 (step 300). If a matching digest is found in the index table 115 (step 305), deduplication daemon 105 sends information to deduplication server 110 indicating that a candidate data block associated with the matching digest has been identified for deduplicating the data block (step 315). A matching digest found in the index table 115 indicates that the data block contains exact same data as data stored in the candidate data block corresponding to the matching digest. However, if no matching digest is found in the index table 115, the digest of the data block is added to the index table 115 (step 310).

Figure 8:
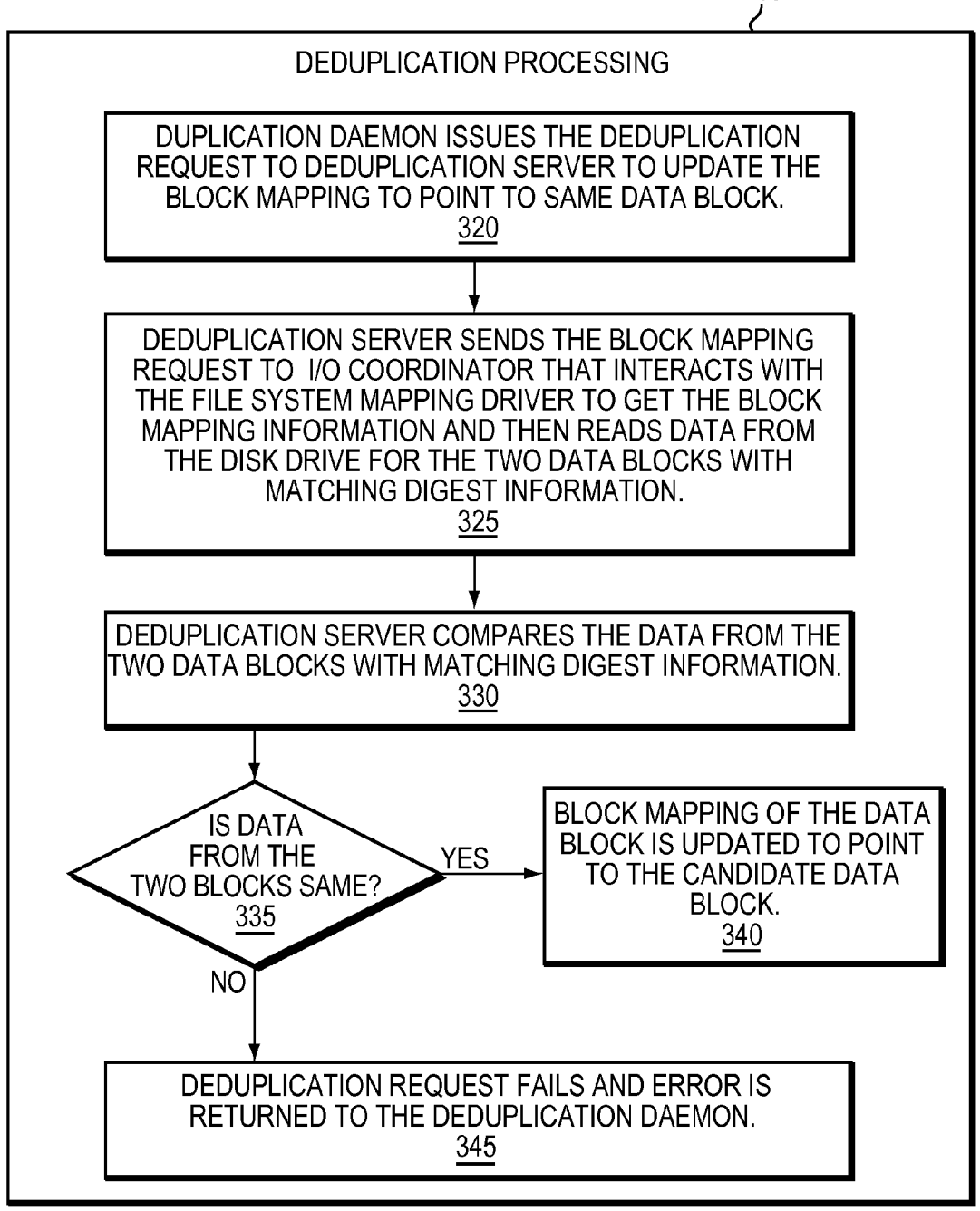

Referring now to FIG. 8 that illustrates a process of deduplicating two data blocks that have been identified by deduplication daemon 105 as duplicate data blocks in FIG. 6 during processing of a digest information where a deduplication request to deduplicate the data blocks has been approved by the file system mapping driver based on the deduplication density of the candidate data block. With reference also to FIG. 4, deduplication daemon 105 issues a request to the deduplication server 110 to update block mapping information in order to deduplicate the data block with the candidate data block (step 320). Deduplication server 110 extracts filesystem information from the digest information of the data block. Deduplication server 110 issues an I/O request to the I/O coordinator 155 (step 325). The I/O coordinator 155 issues a mapping request to the file system mapping driver 165 to find physical address of the data block. If the mapping request completes successfully, the I/O coordinator 155 reads the data from the data block located at the physical address indicated by the mapping. The deduplication server 110 issues a read request for the candidate data block. The read request for the candidate data block is processed identically to the first read request. When the second read request completes, deduplication server 110 compares the data read from the data block with the data read from the candidate data block (step 330). If the data of the data block is not same as the data of the candidate data block, the request to deduplicate the data blocks fails and an error is returned back to the deduplication daemon 105 (step 345). If the data of the data block is same as the data of the candidate data block, the I/O coordinator 155 requests file system mapping driver 165 to deduplicate the two identical data blocks (step 340). If the data blocks are successfully deduplicated, the address mapping of the data block is updated to point to a single copy of the data (i.e. the address map of the data block now points to the address map of the candidate data block) (step 340). If the data blocks are not successfully deduplicated, an error is returned back to the deduplication daemon 105 to update its index table accordingly (step 345).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing deduplication density in a storage system, the method comprising:
   determining a deduplication density of a first data object, wherein the deduplication density is indicated by a number of deduplicated data objects represented by the first data object;
   based on the deduplication density of the first data object, skipping the first data object for applying a deduplicating technique to the first data object;
   creating an association between the first data object and a second data object, wherein the second data object is used for applying the deduplicating technique, wherein data stored in the first data object is identical to data stored in the second data object, wherein creating the association between the first and second data objects include adding a first reference in the first data object pointing to the second data object and adding a second reference in the second data object pointing to the first data object; and
   recovering a set of deduplicated data blocks by using a reference selected from the first reference of the first data object and second reference of the second data object.

2. The method of claim 1, further comprising:
   recovering deduplicated data blocks represented by the first data object by using the second data object referenced by the first reference included in the first data object.

3. The method of claim 1, further comprising:
   recovering deduplicated data blocks represented by the second data object by using the first data object referenced by the second reference included in the second data object.

4. The method of claim 1, wherein a data object is selected from the group consisting of a deduplication domain, a storage extent, a LUN, a file and a data block, wherein the data block is a fixed size chunk of physical disk storage.

5. The method of claim 4, wherein the deduplication domain comprises a set of storage extents, wherein each storage extent of the set of storage extents comprises a set of LUNs, each LUN of the set of LUNs is a logical representation of a subset of physical disk storage.

6. The method of claim 1, wherein a digest is associated with a data object, wherein the digest is based on contents of the data object and uniquely identifies the data object.

7. The method of claim 1, wherein an index table comprises a set of index entries, wherein each index entry of the set of index entries includes a deduplication density of a data object and is associated with a digest of the data object.

8. The method of claim 1, further comprising:
   comparing the deduplication density of the first data object with a threshold value.

9. The method of claim 1, wherein applying the deduplicating technique further comprising:
   computing a digest for a data object; and
   processing the digest for the data object.

10. A system for use in managing deduplication density in a storage system, the system comprising:
    a processor;
    first logic determining a deduplication density of a first data object, wherein the deduplication density is indicated by a number of deduplicated data objects represented by the first data object;

second logic skipping, based on the deduplication density of the first data object, the first data object for applying a deduplicating technique to the first data object;

third logic creating an association between the first data object and a second data object, wherein the second data object is used for applying the deduplicating technique, wherein data stored in the first data object is identical to data stored in the second data object, wherein creating the association between the first and second data objects include adding a first reference in the first data object pointing to the second data object and adding a second reference in the second data object pointing to the first data object; and fourth logic recovering a set of deduplicated data blocks by using a reference selected from the first reference of the first data object and second reference of the second data object.

11. The system of claim 10, further comprising:
fifth logic recovering deduplicated data blocks represented by the first data object by using the second data object referenced by the first reference included in the first data object.

12. The system of claim 10, further comprising:
fifth logic recovering deduplicated data blocks represented by the second data object by using the first data object referenced by the second reference included in the second data object.

13. The system of claim 10, wherein a data object is selected from the group consisting of a deduplication domain, a storage extent, a LUN, a file and a data block, wherein the data block is a fixed size chunk of physical disk storage.

14. The system of claim 13, wherein the deduplication domain comprises a set of storage extents, wherein each storage extent of the set of storage extents comprises a set of LUNs, each LUN of the set of LUNs is a logical representation of a subset of physical disk storage.

15. The system of claim 10, wherein a digest is associated with a data object, wherein the digest is based on contents of the data object and uniquely identifies the data object.

16. The system of claim 10, wherein an index table comprises a set of index entries, wherein each index entry of the set of index entries includes a deduplication density of a data object and is associated with a digest of the data object.

17. The system of claim 10, further comprising:
comparing the deduplication density of the first data object with a threshold value.

18. The system of claim 10, wherein applying the deduplicating technique further comprising:
computing a digest for a data object; and
processing the digest for the data object.

\* \* \* \* \*